US012570047B2

(12) United States Patent
Spicer et al.

(10) Patent No.: US 12,570,047 B2
(45) Date of Patent: Mar. 10, 2026

(54) APPARATUS FOR ADDITIVELY MANUFACTURING AN ARTICLE AT HIGH TEMPERATURES, RELATED TOOLS, AND RELATED METHODS

(71) Applicant: Northrop Grumman Systems Corporation, Falls Church, VA (US)

(72) Inventors: Randy L. Spicer, Sterling, VA (US); Thomas A. Cote, Brambleton, VA (US); Fatima Miranda, Arlington, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 372 days.

(21) Appl. No.: 18/171,966

(22) Filed: Feb. 21, 2023

(65) Prior Publication Data

US 2024/0278497 A1 Aug. 22, 2024

(51) Int. Cl.
| | |
|---|---|
| *B29C 64/295* | (2017.01) |
| *B29C 64/209* | (2017.01) |
| *B33Y 30/00* | (2015.01) |

(52) U.S. Cl.
CPC .......... B29C 64/295 (2017.08); B29C 64/209 (2017.08); B33Y 30/00 (2014.12)

(58) Field of Classification Search
CPC ... B29C 64/118; B29C 64/209; B29C 64/295; B33Y 10/00; B33Y 30/00
See application file for complete search history.

(56) References Cited

U.S. PATENT DOCUMENTS

| | | | |
|---|---|---|---|
| 11,376,788 B2 | 7/2022 | Cote et al. | |
| 2016/0031159 A1 | 2/2016 | Church et al. | |
| 2017/0057168 A1 | 3/2017 | Miller et al. | |
| 2017/0072632 A1 | 3/2017 | Page et al. | |
| 2018/0290365 A1* | 10/2018 | Noorazar | B29C 48/92 |
| 2021/0086443 A1* | 3/2021 | Cote | B29C 64/321 |

FOREIGN PATENT DOCUMENTS

| | | | | |
|---|---|---|---|---|
| CN | 112895448 A | * | 6/2021 | B33Y 30/00 |

OTHER PUBLICATIONS

European Extended Search Report and Opinion for European Application No. 24158534.5, dated Jun. 13, 2024, 8 pages.

* cited by examiner

*Primary Examiner* — Jamel M Nelson
(74) *Attorney, Agent, or Firm* — Dority & Manning, P.A.

(57) ABSTRACT

An apparatus for additively manufacturing an article includes a heat block, a nozzle in operable communication with the heat block and configured to receive a feed material, a heat break coupled to the heat block, at least a portion of the heat break extending into the heat block, and a radiator secured to at least one surface of the heat break. Related tools for additively manufacturing a material in a vacuum and related methods are also disclosed.

19 Claims, 10 Drawing Sheets

*800*

| 802 | HEAT A FEED MATERIAL PROXIMATE A NOZZLE WITH A HEAT BLOCK |

| 804 | TRANSFER HEAT FROM THE HEAT BLOCK TO A HEAT BREAK AND A SUPPORT STRUCTURE, THE HEAT BREAK AND THE SUPPORT STRUCTURE ADJACENT TO THE HEAT BLOCK |

| 806 | TRANSFER HEAT FROM THE HEAT BREAK VIA THERMAL RADIATION WITH A RADIATOR LOCATED ADJACENT TO THE HEAT BREAK DURING DISPENSING OF THE FEED MATERIAL FROM THE NOZZLE |

APPARATUS FOR ADDITIVELY MANUFACTURING AN ARTICLE AT HIGH TEMPERATURES, RELATED TOOLS, AND RELATED METHODS

STATEMENT REGARDING FEDERALLY SPONSORED RESEARCH OR DEVELOPMENT

The Government of the United States of America has rights in this invention pursuant to a U.S. Government contract.

TECHNICAL FIELD

Embodiments of the disclosure relate generally to additive manufacturing tools configured for additively manufacturing one or more articles in at least one of a low pressure or low gravity environments, such as in a vacuum or in space. More particularly, embodiments of the disclosure relate to additive manufacturing tools including a radiator for transferring heat generated by a heat block of the additive manufacturing tool by thermal radiation, and to related methods of fabricating an article with the additive manufacturing tool.

BACKGROUND

Additive manufacturing processes may include sequentially bonding materials together to form a completed article. The article may be formed layer by layer using computer numeric controlled methods to deposit each layer on previously formed layers. Additive manufacturing processes may include, for example, stereolithographic processes, powder bed fusion (PBF) processes such as selective laser sintering (SLS), binder jetting, material extrusion (e.g., fused filament fabrication (FFF)), directed energy deposition (DED) (such as laser metal deposition (LMD)), among other processes.

BRIEF SUMMARY

Embodiments disclosed herein include tools for additive manufacturing an article and to related methods of forming the article using the tool. For example, in accordance with one embodiment, an apparatus for additively manufacturing an article includes a heat block, a nozzle in operable communication with the heat block and configured to receive a feed material, a heat break coupled to the heat block where at least a portion of the heat break extends into the heat block, and a radiator secured to at least one surface of the heat break.

In additional embodiments, a tool for additively manufacturing in a vacuum may include a nozzle configured to receive the feed material, a heat block coupled to the nozzle, and a lattice support structure coupled to the heat block, a center longitudinal axis of the lattice support structure offset from a center longitudinal axis of the nozzle.

In further embodiments, a method for additively manufacturing in a vacuum comprises heating a feed material proximate a nozzle with a heat block, transferring heat in at least one of a microgravity or low-pressure environment from the heat block to a heat break and a support structure, the heat break and the support structure adjacent to the heat block, transferring heat in the at least one of a microgravity or low-pressure environment from the heat break via thermal radiation located adjacent to the heat break while dispensing the feed material from the nozzle, and repeatedly depositing the feed material on a substrate to form an article.

BRIEF DESCRIPTION OF THE SEVERAL VIEWS OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1A:
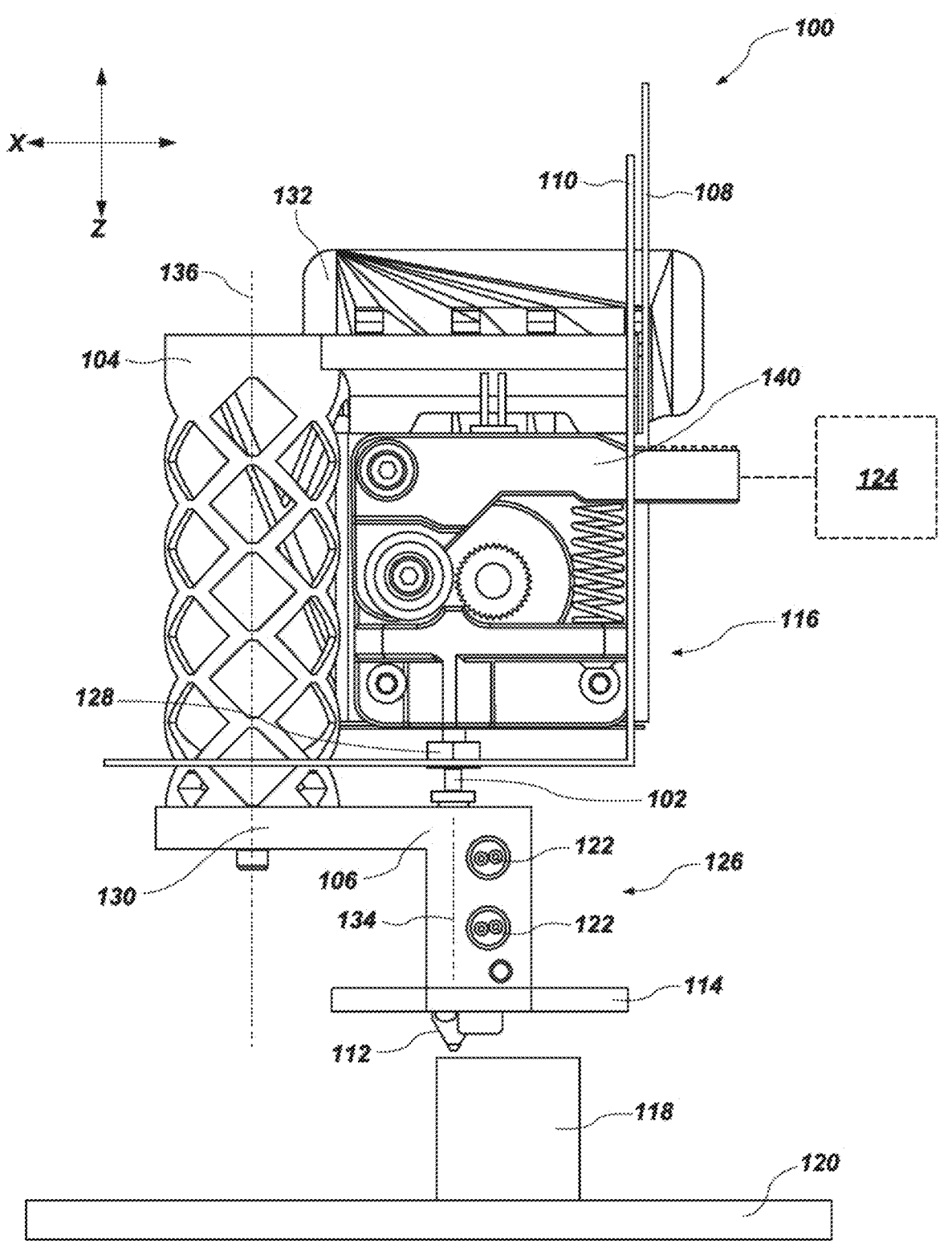
FIG. 1A is a front view of a tool for additively manufacturing an article, according to one or more embodiments of the present disclosure.

Illustrations presented herein are not meant to be actual views of any particular material, component, or system, but are merely idealized representations that are employed to describe embodiments of the disclosure. Additionally, elements common between figures may retain the same numerical designation for convenience and clarity.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for forming an article by additive manufacturing. Only those process acts and structures necessary to understand the embodiments of the disclosure are described in detail below. Additional acts or materials to form an article by additive manufacturing may be performed by conventional techniques.

As used herein, the term "layer" is used to reference manufacturing techniques according to embodiments of the disclosure is to be taken in a broad sense to reference a material or materials deposited or formed at a particular level, or elevation, above a reference plane and not to require that such material or materials form a continuous, unbroken layer or level of material, or that such material or materials deposited at a particular elevation are necessarily of uniform thickness or height. In other words, a "layer" may comprise a discontinuous mass of a material or materials deposited at a particular level, and of a non-uniform thickness or height at such level.

As used herein, the term "vacuum" means and includes a volume having a pressure less than atmospheric pressure, such as a pressure between about 0 kPa and about 101.3 kPa. An absolute vacuum may be substantially devoid of matter. However, as used herein, the term "vacuum" also encompasses so-called "hard vacuums," "soft vacuums," and partial vacuums that may include some matter and may exhibit a pressure greater than 0 kPa, as may be encountered in space.

Temperature control of an additive manufacturing tool and feed materials is of importance during the process of forming an article by an additive manufacturing process. Many additive manufacturing processes include heating the feed materials used to form the article to high temperatures (e.g., above a melting temperature of the feed materials) and depositing the feed materials through a nozzle and onto a surface of the article being formed. A rapid transition from the high temperatures of the feed materials at the nozzle to lower temperatures (e.g., below the melting temperature of the feed materials) at locations away from the nozzle is desired. For example, if heat from the nozzle transfers (e.g., creeps) into other portions of the additive manufacturing tool, the feed material may buckle while being fed to the nozzle, causing the tool to seize (e.g., by disrupting the continuous and uniform flow of the feed material through the nozzle). The likelihood of seizing increases when using feed materials such as engineering grade plastics or other materials with high melting points. For example, using materials with high melting points (e.g., greater than about 250° C.) may increase the likelihood of heat conducting out from the nozzle and causing the feed materials to buckle and seize the additive manufacturing tool.

To transfer heat from the additive manufacturing tool, conventional additive manufacturing tools often include a fan to convectively cool various components of the tool with air. In such tools, the air is directed toward various components of the additive manufacturing tool located away from the nozzle to control the temperature profile of the additive manufacturing tool. At higher temperatures, conventional systems often require sophisticated and expensive active cooling solutions such as cryocoolers, pumps, heat-pipes, or other devices used for active cooling. However, in some environments (e.g., in a vacuum environment, in a zero gravity environment or in a combination thereof), such active cooling solutions may be ineffective, impractical, or infeasible. Moreover, the incorporation of active cooling devices presents additional components (e.g., pumps, blowers, valves) that may fail and may need to be replaced. In extreme environments (e.g., in the vacuum of space), replacement or sophisticated repairs of such active cooling devices may be impossible.

In accordance with this disclosure, an additive manufacturing tool includes a heat break between a heat block and an extruder assembly to passively reduce (e.g., resist) heat transfer from the heat block to the extruder assembly. For example, the heat break may be coupled to and between a heat block and the extruder assembly. Feed materials may pass from the extruder assembly through the heat break to be melted at the heat block and deposited through a nozzle. The feed material may, for example, be deposited at a higher temperature, such as between about 345° C. and about 450° C., compared to conventional techniques. The heat break may reduce (e.g., resist) heat transfer from the heat block to the feed materials as the feed materials are extruded by the extruder assembly. The heat break may be configured to substantially reduce or eliminate heat transfer between the heat block and the feed materials and the heat block may be configured to substantially reflect heat away from the extruder assembly, blocking heat transfer to the feed materials. Reducing the heat transfer to the feed materials in the extruder may reduce (e.g., prevent) the feed materials from buckling before entering the heat block, facilitating a substantially continuous operation of the additive manufacturing tool. A radiator may be secured to at least one surface of the heat break and may be configured to transfer heat from the heat block by means of the heat break during operation of the additive manufacturing tool to reduce the amount of heat that is transferring from the heat block to the extruder assembly. For example, the radiator may be configured to transfer heat from the heat break via conductive thermal transfer and may be further configured to conduct heat from the radiator to an external environment by radiative thermal transfer. The additive manufacturing tool may further include a support structure configured to support the additive manufacturing tool and reduce a likelihood of bending at the heat break and facilitate stable operation of the additive manufacturing tool. In some embodiments, the support structure functions as a passive heatsink for heat generated by the heat block. For example, the support structure may be configured to transfer heat from the heat block by means of the support structure during operation of the additive manufacturing tool to reduce the amount of heat that is transferring from the heat block to the extruder assembly.

Accordingly, the additive manufacturing tool may be operated at higher temperatures without using convective air cooling or cooling by other cooling means, such as liquid cooling. Moreover, the additive manufacturing tool may be operated a higher temperatures without requiring an enclosure, which may allow for greater versatility in the environments that the additive manufacturing tool may operate. For example, the additive manufacturing tool may be used in low gravity (e.g., microgravity) or zero gravity environments, low pressure environments, such as in a vacuum, zero or microgravity in combination with low pressure environments (e.g., in outer space) high pressure environments, or other environments. Additionally, the additive manufacturing tool may be used for additively manufacturing one or more articles in one of these environments (e.g., in outer space), where there is insufficient air to convectively cool heat from the heat block. By way of a non-limiting example, the additive manufacturing tool may be used to fabricate components for satellite structures (e.g., satellite frame structures, a truss structure, etc.), components for aerospace structures (e.g., space shuttles, rockets, satellites, missiles, etc.), components for aircraft structures (e.g., airplanes, helicopters, etc.), components for military vehicle structures, or other structures. In some embodiments, the additive manufacturing tool may be used to repair or fabricate replacement parts for one or more existing structures located in space.

Figure 1B:
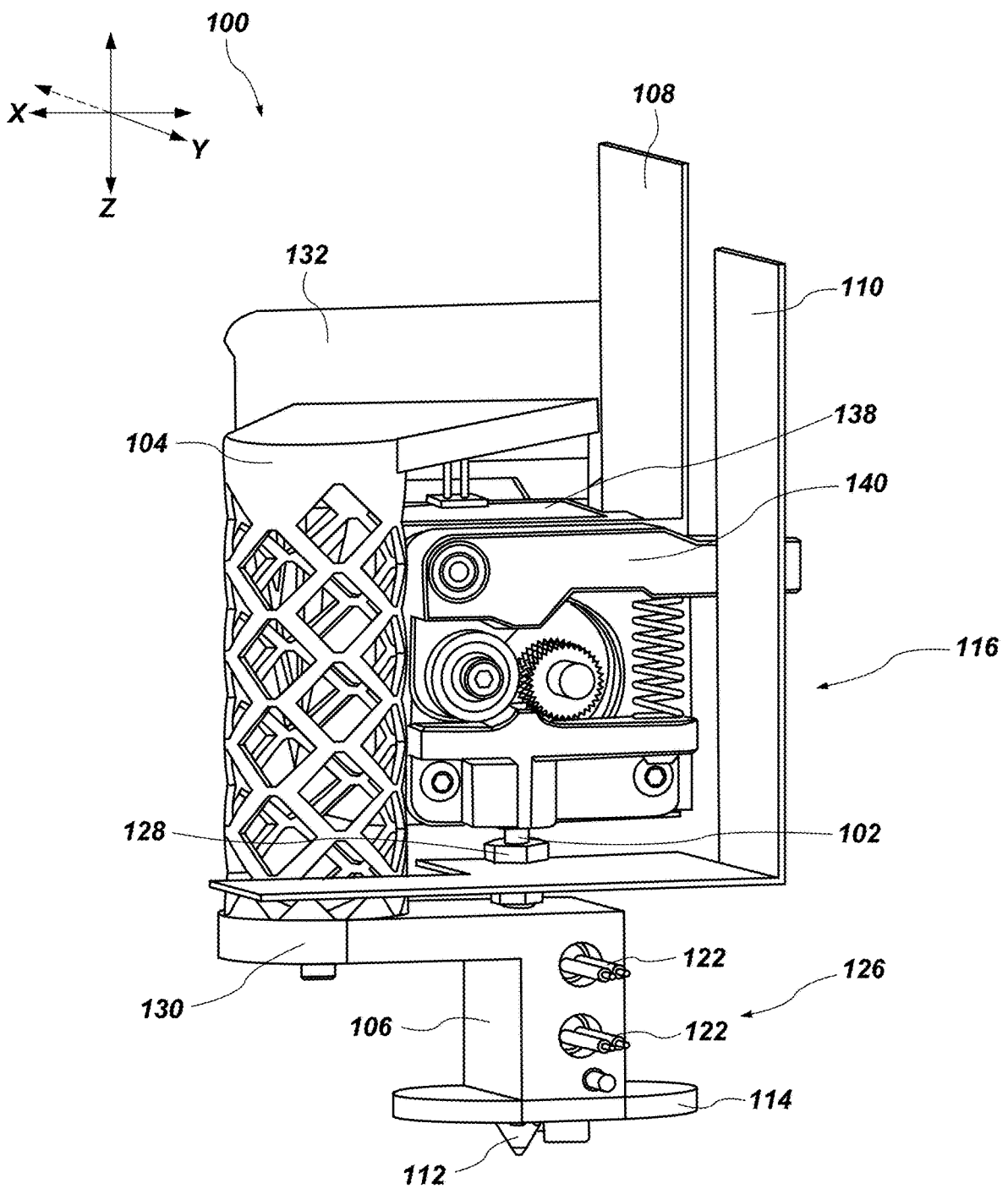
FIG. 1B is a perspective view of the tool of FIG. 1A, according to one or more embodiments of the present disclosure.

FIG. 1A is a front view of a tool 100 (e.g., an additive manufacturing tool) for additively manufacturing an article 118, according to one or more embodiments of the present disclosure. FIG. 1B is a perspective view of the tool 100, according to one or more embodiments of the present disclosure. Referring to both FIGS. 1A and 1B together, the tool 100 may include a nozzle 112, a heat block 106, a heat break 102, an extruder assembly 116, a heating assembly 126, a heat shield 114, a support structure 104, a heat break radiator 110, an extruder radiator 108, a controller 124, and a build surface 120 (e.g., a platen) for supporting the article 118 manufactured by the tool 100.

The heat break 102 is located between the extruder assembly 116 and the heating assembly 126 such that a feed material may pass from the extruder assembly 116, through the heat break 102 and into the heating assembly 126 to be melted and deposited to form the article 118 on the build surface 120 using the nozzle 112. The nozzle 112 may be located at a distal longitudinal end of the tool 100 (e.g., distal from the extruder assembly 116). In other words, the heat block 106 and the heat break 102 may intervene between the extruder assembly 116 and the nozzle 112.

The heat break 102 may be configured to reduce (e.g., resist) thermal transfer through the heat break 102. The heat break 102 may comprise one or more of titanium, a titanium alloy, or any metal with thermal conductivity resistive properties and a melting point above 600° C. In some embodiments, the heat break 102 may comprise any heat-resistant material sufficient to facilitate the passage of a feed material from the extruder assembly 116 therethrough and to the heating assembly 126 while limiting thermal transfer from the heating assembly 126 to the extruder assembly 116.

In some embodiments, the heat break 102 includes one or more lateral walls (e.g., outer wall 316 (FIG. 3B)), at least a portion of the one or more lateral walls having a thickness configured to reduce thermal transfer therethrough. For example, the heat break 102 may have a substantially cylindrical shape, wherein a thickness of the lateral walls thereof varies along a longitudinal axis 318 (FIG. 3B) of the heat break 102. The longitudinal axis 318 of the heat break 102 may extend through a center of the heat break 102. The feed material is received by the heat break 102 from the extruder assembly 116 and is directed through the center of the heat break 102 along the longitudinal axis 318 of the heat break 102. In some embodiments, at least a portion of the lateral wall has a thickness less than other portions of the lateral wall such that less heat is conducted through the at least a portion of the lateral wall relative to the other portions of the lateral wall.

The heat break radiator 110 may be configured to be secured to and contact at least one surface of the heat break 102 to facilitate thermal transfer from the heat break 102 to the heat break radiator 110. In some embodiments, the heat break radiator 110 surrounds at least a portion of the heat break 102. In some embodiments, the heat break radiator 110 comprises an at least substantially planar portion defining an opening through which at least a portion of the heat break 102 may extend. In some embodiments, the heat break radiator 110 (or any radiator discussed herein) may exhibit a greater thermal conductivity than other components of the tool 100.

The heat break radiator 110 may be secured to at least one surface of the heat break 102 by a heat break nut 128. At least a portion of the heat break 102 may be threaded to receive the heat break nut 128 to secure the heat break radiator 110 to at least one surface of the heat break 102. For example, at least a portion of the heat break 102 (e.g., an at least partially threaded portion) may extend through the opening defined by the heat break radiator 110 and the heat break nut 128 may be configured to secure the heat break radiator 110 to the heat break 102. The heat break nut 128 may be configured to secure the heat break radiator 110 using a corresponding washer.

The heat break nut 128 may include one or more of titanium, stainless steel, steel having about 15 weight percent chromium and about 10 weight percent nickel, hafnium, an alloy of nickel including chromium and iron (e.g., Inconel), or another material. In some embodiments, the heat break nut 128 comprises substantially the same material composition as the heat break 102. In some embodiments the heat break nut 128 and/or the washer may comprise titanium.

In some embodiments, the heat break radiator 110 comprises copper. In some embodiments, the heat break radiator 110 is coated with one or more materials to increase the thermal radiation (e.g., an emissivity) of the surfaces of the heat break radiator 110. The one or more materials may include one or more of black paint, aluminum including a chromate coating (e.g., iridite aluminum, an alloy including chromium and aluminum), nickel, white paint, an optical solar reflector, and silvered polytetrafluoroethylene. In some embodiments, at least surfaces of the heat break radiator 110 facing the heat block 106 when the heat break radiator 110 is fastened to the heat break 102 may be coated to radiate heat generated by the heat break away from the extruder assembly 116.

The heating assembly 126 may include the heat block 106, one or more heating elements 122, and optionally, the heat shield 114. The heat block 106 may be configured to receive at least a portion of the heat break 102 such that at least a portion of the heat break 102 extends into the heat block 106 (more clearly illustrated in FIG. 2). The heat break 102 may be secured (e.g., coupled) to the heat block 106 such that during use and operation, feed material from the extruder assembly 116 passes from the heat break 102 through the heat block 106. The heat block 106 may be configured to receive the heating elements 122. The heating elements 122 may be configured to heat the heat block 106 to temperatures sufficient to melt the feed material as the feed material passes through the heat block 106 and to the nozzle 112.

The optional heat shield 114 may be substantially planar and configured to surround at least a portion of the nozzle 112. In other words, at least a portion of the nozzle 112 may extend through the heat shield 114. The heat shield 114 may be configured to reflect heat emanating from the heat block 106 away from the article 118 or the build surface 120. The heat shield 114 may comprise a material formulated and configured to reflect thermal energy. In some embodiments, the heat shield 114 comprises alumina.

In some embodiments, the heating assembly 126 includes a flexible thermally insulative material (e.g., an insulated blanket) that at least partially surrounds the heat block 106. The insulative material may be configured to reduce thermal transfer of heat from the heat block 106 and the feed material deposited on the build surface 120 to the surrounding environment or other components of the tool 100. In some embodiments, the flexible thermally insulated material may include multiple layers of insulative materials. Moreover, in some embodiments, the insulative material is secured to at least one surface of the heat block 106 or the heat break 102. For example, the insulative material may intervene between the heat block 106 and the extruder assembly 116. The insulative material may be configured to allow the tool 100 to move in an at least an x, y, and z axis and manufacture an article 118 (e.g., article 118) while the insulative material is secured to the tool 100.

The thermally insulative material may comprise multi-layer insulation (comprising, for example, layers of at least one polyimide, polyester, or aluminum), or a single thermal insulation material.

The heat block 106 may be configured to receive and couple to the support structure 104. For example, in some embodiments, the heat block 106 may include a substantially planar receiving portion 130 extending from a longitudinal end (e.g., in the Z-direction) of the heat block 106 in a direction substantially orthogonal to a longitudinal axis 134 of the heat block 106, as shown in FIG. 1A. The substantially planar receiving portion 130 may be configured to receive at least a portion of the support structure 104. For example, as shown in FIG. 1A, a portion of the support structure 104 may be received and secured to the heat block 106 at the substantially planar receiving portion 130. The support structure 104 may also be secured to the extruder assembly 116. Accordingly, the support structure 104 may be secured to both the heat block 106 and the extruder assembly 116, providing support and rigidity to the tool 100. Though FIG. 1A depicts the support structure 104 being secured to the heat block 106 via the substantially planar receiving portion 130, the present disclosure is not intended to be so limited. For example, the support structure may be of any size, orientation, or positioning so long as the support structure 104 facilitates retention of the relative locations of the heat block 106 and the extruder assembly 116 during operation of the tool 100. As a specific non-limiting example, the support structure 104 may be positioned between the heat block 106 and the extruder assembly 116 such that the support structure surrounds the heat break 102.

The support structure 104 may have a substantially cylindrical shape structured to provide support to the tool 100, such as by fixing the location of the heat block 106 relative to the extruder assembly 116. In some embodiments, and as shown in FIG. 1A, the support structure 104 includes sidewalls having a lattice structure. While the sidewalls of the support structure 104 are illustrated in FIG. 1A as having a particular shape, one of ordinary skill in the art will appreciate that the support structure 104 may comprise any other shape so long as the support structure 104 facilitates the retention of the relative location of the heat block 106 and the extruder assembly 116 during operation of the tool 100. In some embodiments, a longitudinal axis 136 of the support structure 104 may be offset from the longitudinal axis 318 (FIG. 3B) of the heat break 102. The longitudinal axis 136 of the support structure 104 may extend through a center (e.g., a radial center) of the support structure 104. For example, the support structure 104 may be positioned such that the longitudinal axis 136 of the cylindrical portion is offset (e.g., in the X-direction, in the Y-direction) from the longitudinal axis 318 (FIG. 3) of the heat break 102 and, thus, the longitudinal axis of the nozzle 112. In some such embodiments, the longitudinal axis 136 of the support structure 104 is laterally offset (e.g., in the X-direction, in the Y-direction) from the feed material as the feed material is extruded through the extruder assembly 116, the heat break 102, the heat block 106, and the nozzle 112. By offsetting the longitudinal axis 136 of the support structure 104 from the feed material, the tool 100 may accommodate forms of the support structure 104 that have a larger surface area to absorb and dissipate heat transferred from the heat block 106 to the support structure 104 during operation of the tool 100. Moreover, by enabling a larger surface area, the support structure 104 may also provide greater support to the tool 100 during operation. In other embodiments, the longitudinal axis 136 of the support structure 104 may align with the longitudinal axis 318 (FIG. 3) of the heat break 102 and, thus, the longitudinal axis of the nozzle 112. For example, the support structure 104 may be positioned to surround the heat break 102.

The support structure 104 may be configured to provide support for the tool 100 during use and operation of tool 100. For example, the support structure 104 may substantially reduce the likelihood of the tool 100 bending at the heat break 102 when a lateral force (e.g., a lateral force in the x or y direction) is exerted against the heating assembly 126 or the nozzle 112 during operation of the tool 100. In addition to providing structural support to the tool 100, the support structure 104 may be configured to dissipate heat generated by the heat block 106 away from the extruder assembly 116 and other components of the tool 100. For example, the support structure 104 may be shaped to form a lattice support structure such that, as heat is conducted by the heat block 106 though the support structure 104 (e.g., by means of the substantially planar receiving portion 130), the surrounding ambient environment may cool the support structure 104. The lattice structure may be formed so as to increase the amount of surface area of the support structure 104 that is exposed to environmental temperatures compared to a solid cylindrical structure. Though described in terms of a lattice structure, a person of ordinary skill in the art will appreciate that any structural form may be used so long as the structural form is able to provide support for the tool 100 during operation. Additionally, the support structure 104 may be made from a heat resistant material (e.g., titanium), which may further enable the support structure 104 to resist thermal transfer of heat from the heat block 106 to the extruder assembly 116.

In some embodiments, the cylindrical walls of the lattice structure of the support structure 104 may include an open area. In other words, the walls of the support structure 104 may not be defined by substantially continuous walls and may include openings defining the lattice structure. In some embodiments, compared to a solid cylindrical surface, the sidewalls of the support structure 104 may include from about 40 percent to about 80 percent void region (e.g., open regions) by volume, such as from about 40 percent to about 50 percent, from about 50 percent to about 60 percent by volume, from about 60 percent to about 70 percent, or from about 70 percent to about 80 percent void region by volume.

The extruder assembly 116 may include an extruder that includes a feed material and is coupled to the heat break 102 and in operable communication with the heat block 106. The extruder assembly 116 may also comprise a motor 138 operably coupled to the extruder 140 and configured to allow the extruder 140 to provide the feed material to the nozzle 112 through the heat break 102 and heat block 106. The feed material may comprise at least one of a thermoplastic material, a thermopolymer, or another material. By way of nonlimiting example, the feed material may comprise at least one of acrylonitrile butadiene styrene (ABS), polyacetic acid (PLA), polyethylene terephthalate glycol (PETG), polylactic acid, high impact polystyrene (HIPS), thermoplastic polyurethane (TPU), aliphatic polyamides (nylon), polyether ether ketone (PEEK), another material, a polymeric material (e.g., an epoxy material; a thermoplastic polymer material, such as one or more of a polyethylene (PE) material, a polypropylene (PP) material, a polystyrene (PS) material, a polyvinyl chloride (PVC) material, a poly (methyl methacrylate) (PMMA) material, a polycarbonate (PC) material, a polyphenylene oxide (PPO) material, a polyetherketone (PEK) material, a polyetheretherketone polyetheretherketone (PEEK) material, a polyaryletherketone (PAEK) material, a polyetherketoneketone (PEKK) material, a polyetherimide (PEI) material, a polyetherketoneetherketoneketone (PEKEKK) material, a polyether sulfone (PES) material, a polyphenylene sulfide (PPS) material, a polyphenylsulfone (PPSU) material, a polyphenylene material, an aromatic polyamide (PA) material, and a polyamideimide (PAI) material, a preceramic polymer, such as one or more of a polysiloxanes, polysilazane, polycarbosilane and polysilsesquioxane, a polyurethane (PU) material, a phenol-formaldehyde material, a urea-formaldehyde material, and a polyester material, a glass material, a carbon-containing material, a boron-containing material.

In some embodiments, the feed material may optionally include one or more additive materials. By way of nonlimiting example, the additives may include one or more of nanotubes (e.g., carbon nanotubes (CNTs) (e.g., single wall carbon nanotubes (SWCNTs), multi-walled carbon nanotubes (MWCNTs)), tungsten sulfide ($WS_2$) nanotubes, molybdenum sulfide ($MoS_2$) nanotubes, tin sulfide ($SnS_2$) nanotubes, zirconium dioxide ($ZrO_2$) nanotubes, zinc oxide (ZnO) nanotubes, carbon nitride nanotubes, aluminum nanotubes, etc.), carbon black, a glass-containing material (e.g., glass fibers (e.g., fibers of silicon dioxide)), carbon fibers, ceramic fibers (e.g., oxide-based ceramic fibers, such as one or more of alumina fibers, alumina-silica fibers, and alumina-boria-silica fibers; non-oxide-based ceramic fibers, such as one or more of silicon carbide (SiC) fibers, silicon nitride (SiN) fibers, etc.), other fibers, silicon carbide particles, particles (e.g., nanoparticles) of one or more of nickel, iron, cobalt, iron, carbon, silicon, etc.), nanostrands (e.g., nanostrands of one or more of nickel, iron, cobalt, or iron, carbon, silicon, etc.).

The concentration of the additives in the feed material may be between about 0.1 weight percent and about 80.0 weight percent, such as between about 0.1 weight percent and about 0.5 weight percent, between about 0.5 weight percent and about 1.0 weight percent, between about 1.0 weight percent and about 2.0 weight percent, between about 2.0 weight percent and about 5.0 weight percent, between about 5.0 weight percent and about 10.0 weight percent, between about 10.0 weight percent and about 20.0 weight percent, between about 20.0 weight percent and about 30.0 weight percent, between about 30.0 weight percent and about 40.0 weight percent, between about 40.0 weight percent and about 60.0 weight percent, or between about 60.0 weight percent and about 80.0 weight percent. In some embodiments, the concentration of the additives in the matrix may be between about 5.0 weight percent and about 15.0 weight percent. In some embodiments, the concentration of the additives in the feed material may affect the structural and the electrical properties of the article 118.

Although the feed material has been described as including various materials and additives, the disclosure is not limited by the composition of the feed material. In other words, the feed material may comprise materials other than, and in addition to, those described above.

An extruder radiator 108 may be coupled to the extruder assembly 116 and configured to passively dissipate heat generated by the extruder assembly 116, such as by thermal radiation. For example, the extruder radiator 108 may be positioned such that at least a portion of the extruder radiator 108 is secured between the motor 138 and the feed material extruder. The extruder may have substantially the same properties as described above with regard to the heat break radiator 110.

For example, the extruder radiator 108 (or the heat break radiator 110) may comprise copper. In some embodiments, the extruder radiator 108 comprises substantially the same material composition as the heat break radiator 110. As described above with reference to the heat break radiator 110, the extruder radiator 108 may be coated with one or more of black paint, white paint, an optical solar reflector, and silvered polytetrafluoroethylene.

The tool 100 may also include an interface bracket 132 configured to interface with devices (e.g., commercial devices) used for additive manufacturing. For example, the interface bracket 132 facilitates interfacing of the tool 100 with an additive manufacturing device configured to translate the tool 100 in an x, y, or z-direction. In some embodiments, the additive manufacturing device is configured to translate the tool 100 along at least 6 degrees of freedom (e.g., by using a robot arm).

The controller 124 may include a processor, a memory, a storage device, an I/O interface, and a communication interface, which may be communicatively coupled by way of a communication infrastructure. In one or more embodiments, the processor includes hardware for executing instructions, such as those making up a computer program. The memory may be used for storing data, metadata, and programs for execution by the processor(s). The storage device includes storage for storing data or instructions. The I/O interface allows a user to provide input to, receive output from, and otherwise transfer data to and receive data from the tool 100. The communication interface can include hardware, software, or both. The communication interface may provide one or more interfaces for communication (such as, for example, packet-based communication) between the tool 100 and one or more other computing devices or networks.

In operation, the controller 124 may slice a three-dimensional model into layers via a conventional process to create a two-dimensional slice (e.g., a two-dimensional image) of each layer. Subsequently, the extruder assembly 116 may provide the feed material through the heat break 102 to the heating assembly 126. The feed material may pass through the extruder assembly 116 and be received by the heat block 106. The heating element 122 may heat the heat block 106, and thereby the feed material, to a melting temperature of the feed material as the feed material passes through the nozzle 112 and onto the build surface 120 to manufacture the article 118. For example, the tool 100 may be configured to move in the x-direction and the y-direction to form a thin layer of the feed material (e.g., 0.1 mm thick layer of material) over the build surface 120 or a previously formed layer of the article 118 via the nozzle 112 according to a two-dimensional image of a layer of the three-dimensional model. After deposition, the melted feed material may solidify (e.g. harden) to form a layer of the article 118. The build surface 120 may then be incrementally lowered in the z-direction for the deposition of a subsequent layer on or around one or more previously deposited layers. In other embodiments, at least a portion of the tool 100 (e.g., the nozzle 112, the heating assembly 126, and the extruder assembly 116) may be configured to incrementally raise in the z-direction.

Figure 2:
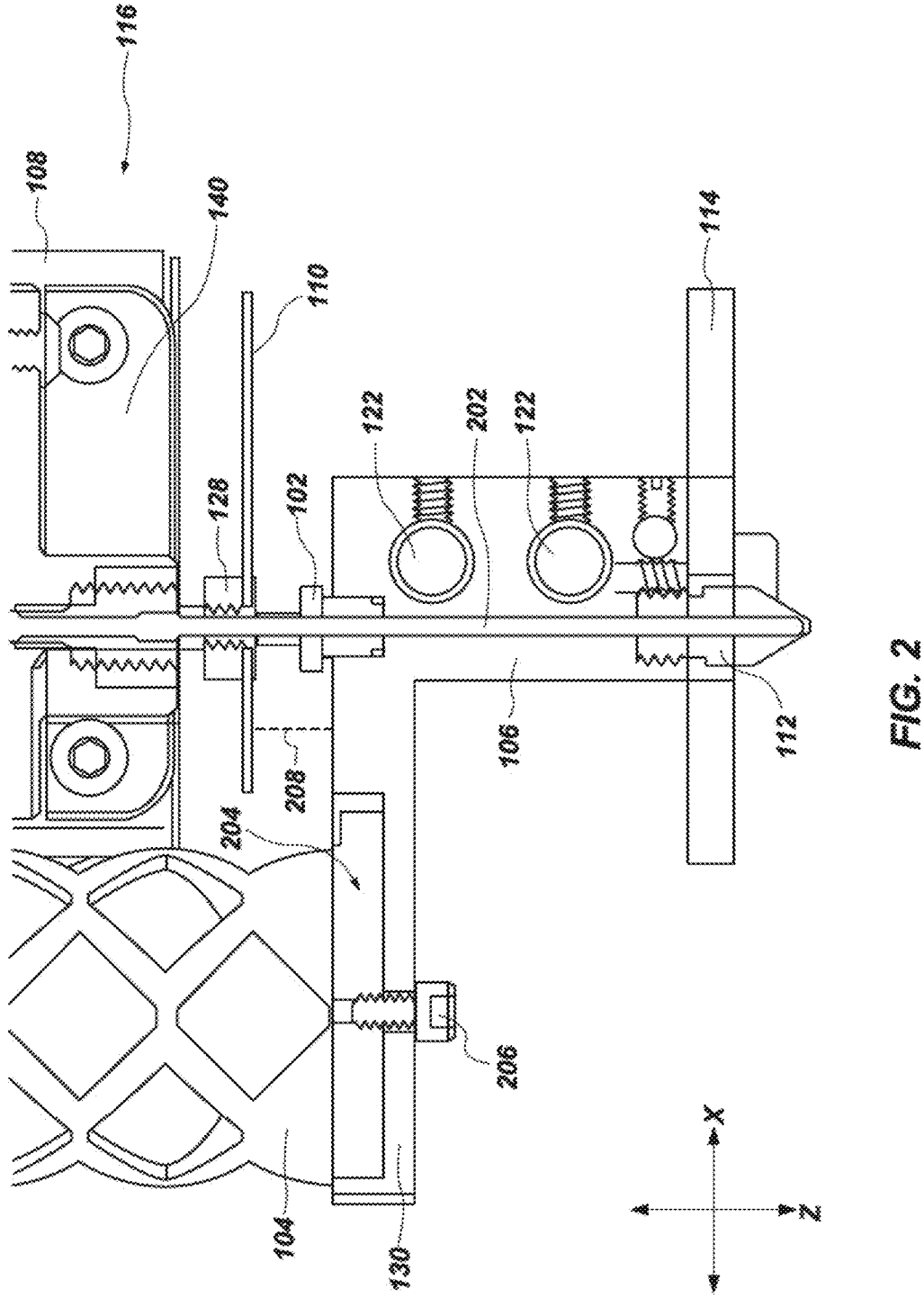
FIG. 2 is a simplified partial cross-sectional diagram of the tool of FIGS. 1A and 1B, according to one or more embodiments of the present disclosure.

FIG. 2 is a cross-sectional diagram of the tool 100, according to one or more embodiments of the present disclosure. Referring to FIGS. 1A, 1B, and 2 together, the extruder assembly 116, the heat break 102, the heat block 106, and the nozzle 112 may define a feed material path 202. The feed material path 202 may extend through the longitudinal axis 318 of the heat break 102. The support structure 104 may be received in the substantially planar receiving portion 130 of the heat block 106 by way of a receiving area 204 (e.g., a recess within the substantially planar receiving portion 130) and secured to the heat block 106 via the fastening means 206. The fastening means 206 may comprise, for example, a bolt, screw, or other fastening means. In operation, the extruder assembly 116 may extrude the feed material through the heat break 102, the heat block 106, and the nozzle 112 to be deposited on a surface (e.g., build surface 120) or a layer of the article 118. As the feed material passes through the heat block 106, heating elements 122 generate heat to heat the surrounding heat block 106, facilitating heating of the feed material to at least a melting temperature of the feed material before the feed material passes through the nozzle 112. In some embodiments, heat generated by the heating elements 122 is conducted into the heat block 106, through the heat break 102, and to the heat break radiator 110. The heat may also be conducted though the heat block 106 to the support structure 104. The heat break radiator 110 and the support structure 104 are configured to facilitate removal of heat that is transferred through the heat break 102 and substantially reduce heat transfer to the extruder assembly 116. Furthermore, heat shield 114 may be configured to reflect heat radiating from the material deposited on build surface 120 away from the tool 100.

With reference to FIG. 2, heat break radiator 110 may, when secured to the heat break 102, may be spaced from the heat block 106 by a gap 208 such that the heat break radiator 110 does not directly contact the heat block 106 The fastening means 206 may comprise, for example, titanium, stainless steel, steel having about 15 weight percent chromium and about 10 weight percent nickel, hafnium, an alloy of nickel including chromium and iron (e.g., Inconel), or another material. The fastening means 206 and the heat break nut 128 may exhibit a thermal conductivity less than about 22 W/m-K at a temperature of about 25° C. Washers may be used in conjunction with the fastening means 206 or the heat break nut 128. The washers may comprise the same material composition as the fastening means 206 and the heat break nut 128 or may also comprise different materials.

Figure 3A:
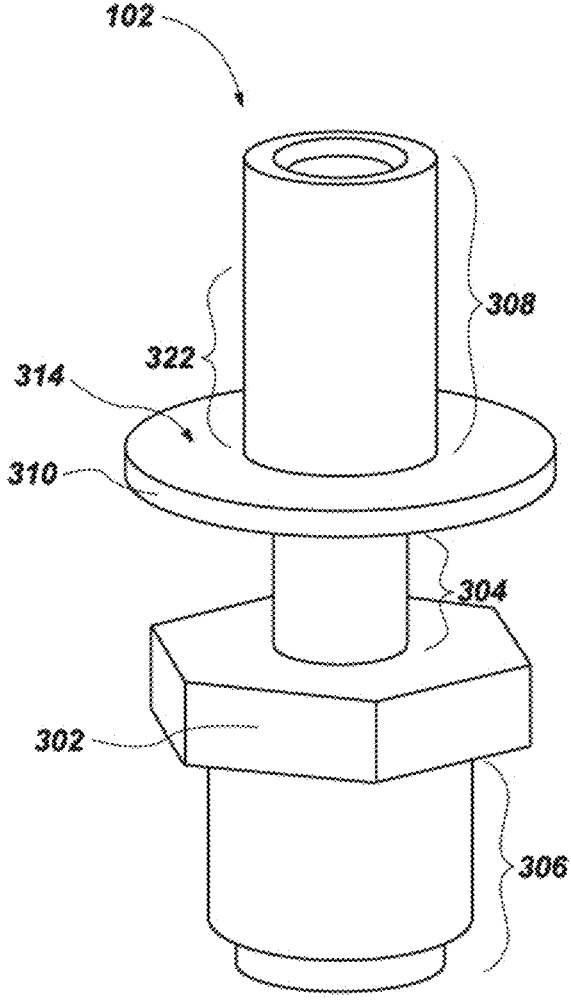
FIG. 3A is a perspective view of a heat break, according to one or more embodiments of the present disclosure.
Figure 3B:
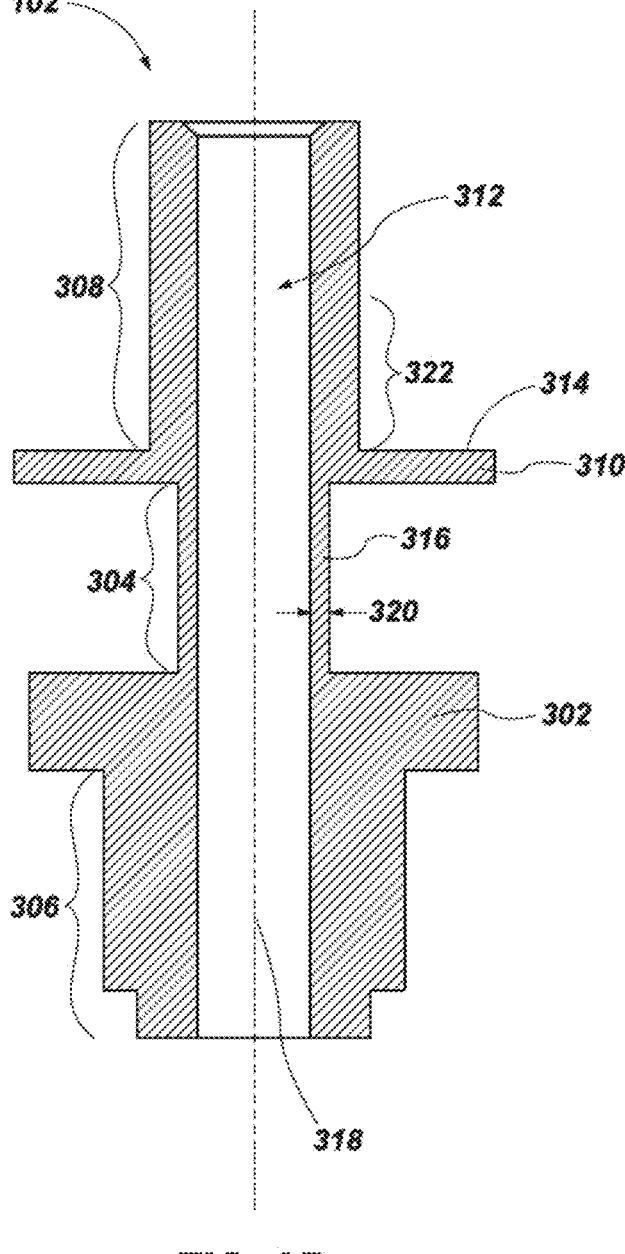
FIG. 3B is a cross sectional view of the heat break of FIG. 3A, according to one or more embodiments of the present disclosure.

FIG. 3A is a perspective view of heat break 102, according to one or more embodiments of the present disclosure. FIG. 3B is a cross sectional view of the heat break 102, according to one or more embodiments of the present disclosure. Referring to both FIGS. 3A and 3B together, the heat break 102 may include a first protruding portion 308, a neck portion 304, and a second protruding portion 306. The heat break 102 may also include an interface flange 310 and a grip flange 302. The heat break 102 may be configured to interface with a radiator (e.g., heat break radiator 110) via the interface flange 310. The interface flange 310 may include an interface flange surface 314 configured to interface with a radiator. In some embodiments, the heat break radiator 110 defines an aperture (e.g., heat break opening 502 (FIG. 5A)) configured to allow the first protruding portion 308 to extend there through. A surface of the heat break radiator 110 may interface with the interface flange surface 314 as the first protruding portion 308 extends through the aperture defined by the radiator. An outer surface of the first protruding portion 308 may be at least partially threaded and configured to engage a nut (e.g., radiator heat break nut 128). For example, a threaded portion of the outer surface of the first protruding portion 308 may begin at the interface flange 310 and extend along a longitudinal axis of the heat break 102 to at least partially cover the outer surface of the first protruding portion 308. The heat break radiator 110 may be secured to the interface flange surface 314 of the heat break 102 via a nut. In some embodiments, a washer is secured between the nut and the heat break radiator 110.

The heat break 102 may be configured to be secured to the extruder assembly 116 via the first protruding portion 308. For example, at least part of the first protruding portion 308 may include a threaded portion (e.g., portion 322) configured to interface with a threaded portion of the heat break nut 128. Furthermore, in some embodiments the entirety of the first protruding portion 308 may be threaded and be configured to interface with a receiving threaded portion of the extruder assembly 116 such that feed material extruded by the extruder assembly may pass through the feed material passageway 312. For example, the first protruding portion may be configured to interface with a receiving threaded portion of the extruder assembly 116 beginning at a longitudinal end of the first protruding portion 308 opposite the interface flange surface 314.

The neck portion 304 may include an outer wall 316. The outer wall 316 may have a thickness 320 (e.g., in the radial direction, such as a difference between an inner diameter of the outer wall 316 and an outer diameter of the outer wall 316) configured to reduce thermal transfer from the heat block 106 through the heat break 102. For example, in some embodiments the thickness 320 of the outer wall 316 of the neck portion 304 may be less than a thickness of other portions of the heat break 102. In some embodiments, the thickness of the outer wall 316 of the heat break 102 may be less than a thickness of a radiator (e.g., heat break radiator 110). As a non-limiting example, the thickness of the outer wall 316 of the heat break 102 may be within a range of from about 0.05 mm to about 1.00 mm, such as from about 0.15 mm to about 0.25 mm, or from about 0.15 mm to about 0.35 mm.

The second protruding portion 306 may be configured to couple the heat break 102 to the heat block 106. For example, at least a portion of an outer wall of the second protruding portion 306 may include a threaded portion configured to be received by a threaded portion of the heat block 106 such that at least portion of the second protruding portion 306 extends into the heat block 106. The grip flange 302 may be configured to facilitate threading of the heat break 102 into the receiving threaded portion of the heat block 106 (e.g., such as with a wrench) and also prevent the heat break 102 from extending into the heat block 106 beyond the grip flange 302.

In operation, when the heat break 102 is coupled between the heat block 106 and the extruder assembly 116, heat from the heat block 106 may be conducted through the heat break 102 and to the heat break radiator 110 secured to the heat break 102. The neck portion 304 of the heat break 102 may reduce the thermal transfer through the heat break 102 such that the extruder assembly 116 is substantially thermally isolated from the heat block 106.

Figure 4:
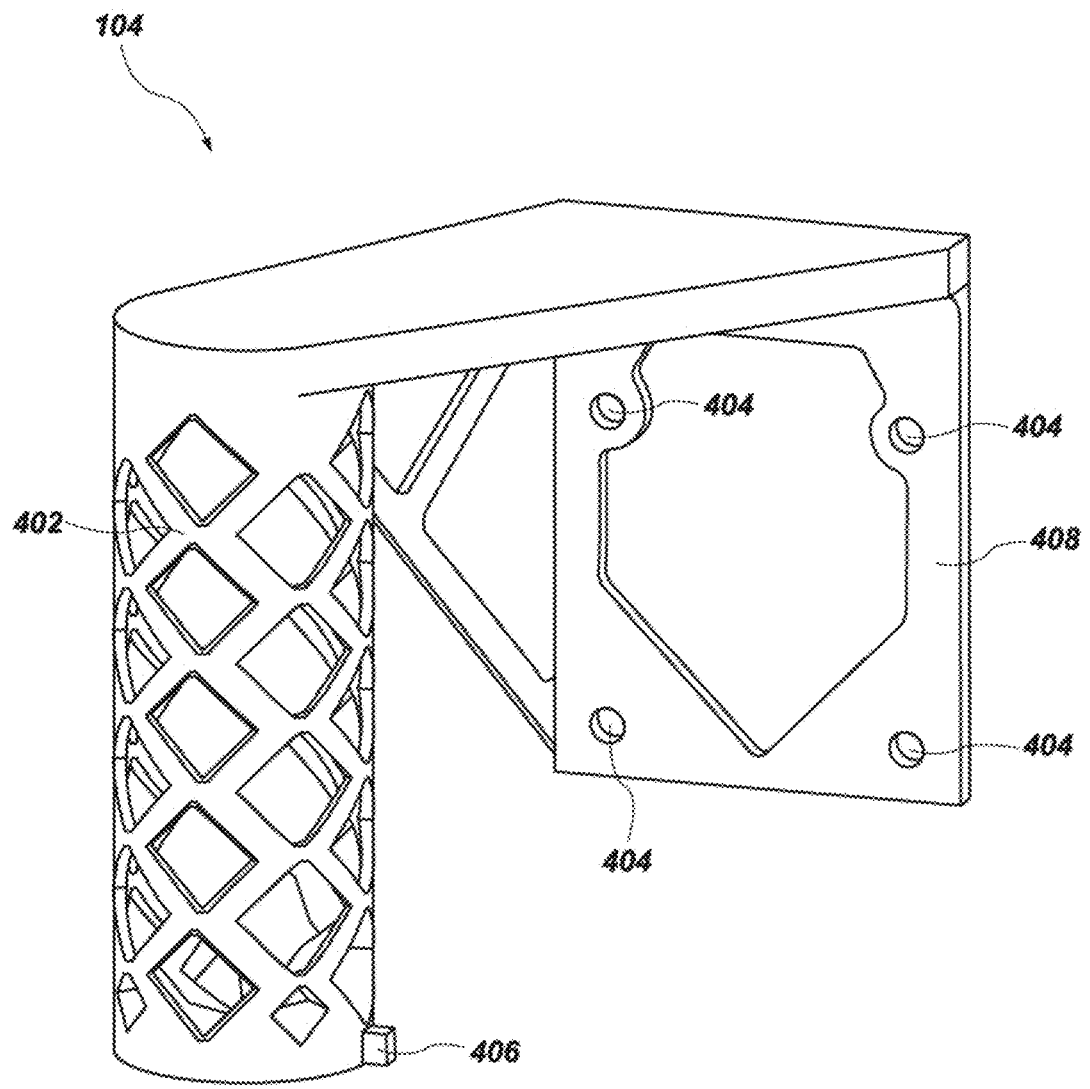
FIG. 4 is a perspective view of a support structure according to one or more embodiments of the present disclosure.

FIG. 4 is a perspective view of the support structure 104, according to one or more embodiments of the present disclosure. The support structure 104 may include a lattice structure 402 and an interface portion 408. The interface portion 408 may define apertures 404 configured to facilitate attachment of the support structure 104 to another structure. For example, the interface portion 408 may be fastened to a surface of the extruder assembly 116 with fastening means (e.g., bolts, screws, etc.) to secure the interface portion 408 to the extruder assembly 116 via the apertures 404. The lattice structure 402 may include a protruding member 406 at a longitudinal end of the lattice structure 402 and configured to be received in the receiving area 204 (FIG. 2) of the heat block 106 (FIG. 2) when the lattice structure 402 is positioned within the receiving area 204. The heat block 106 may define the receiving area 204 including a slot configured to receive the protruding member 406 to facilitate proper orientation of the lattice structure 402 when the lattice structure 402 is disposed within the receiving area 204. As described above, the lattice structure 402 may further comprise a generally cylindrical hollow structure defining a plurality of voids and crossing patterns in the outer wall thereof. The size of the voids of the lattice structure 402 may be configured to allow for a greater surface area of the support structure 104 to be exposed to environmental temperatures compared to a hollow cylindrical structure without the voids to facilitate increased thermal transfer (e.g., radiative thermal transfer) from the lattice structure 402 and substantially reduce thermal transfer of heat from the support structure 104 to other parts of the tool 100. Furthermore, the size of the voids of the lattice structure 402 may be sized and shaped in order to reduce the thermal heat transfer though the support structure 104. For example, the size of the voids may be configured to provide less solid material (e.g., the material that the lattice structure is made from) to conduct heat produced by the heat block 106. In some embodiments at least one surface of the support structure 104 contacts the extruder radiator 108, facilitating thermal transfer from the support structure 104 to the extruder radiator 108. The size of the plurality of voids defined by the lattice structure 402 may reduce the thermal mass of the lattice structure 402.

The support structure may be comprised of titanium. However, one of ordinary skill in the art will appreciate that any substantially rigid material may be used. As a non-limiting example, the support structure 104 may comprise one or more of titanium, stainless steel, steel having about 15 weight percent chromium and about 10 weight percent nickel, hafnium, an alloy of nickel including chromium and iron (e.g., Inconel), or another material.

Figure 5:
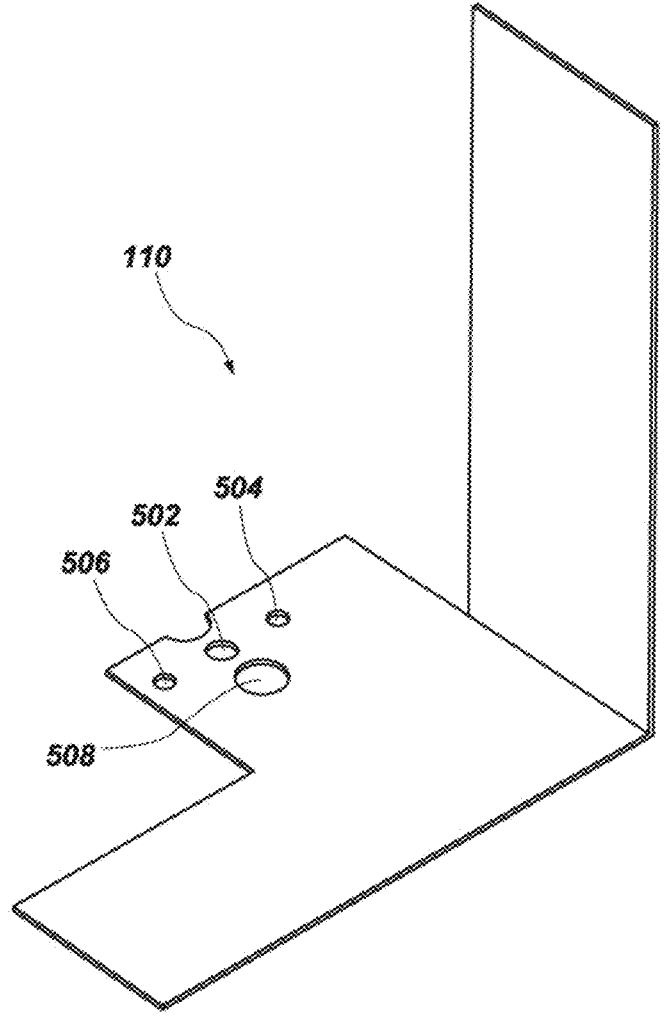
FIG. 5 is a perspective view of a radiator, according to one or more embodiments of the present disclosure.

FIG. 5 is a perspective view of the heat break radiator 110, according to one or more embodiments of the present disclosure. The heat break radiator 110 may comprise a material exhibiting a greater thermal conductivity than other portions of the tool 100. In some embodiments, the heat break radiator 110 comprises copper. In some embodiments, the heat break radiator 110 may define a cross sectional shape resembling an "L." In some embodiments, the heat break radiator 110 defines a heat break opening 502 configured to receive at least a portion of first protruding portion 308 (FIG. 3B) of heat break 102 (FIG. 3A, FIG. 3B). The heat break radiator 110 may also define other openings (e.g., openings 506, 504, and 508), which may be configured to receive fastening means or electrical wiring used for powering and operating the tool 100. The heat break radiator 110 may be sized and shaped such that, when positioned between the heat block 106 and the extruder assembly 116, the heat break radiator 110 may shield or reflect heat away from the extruder assembly (e.g., heat emanating from the heat block 106 during operation of the tool 100).

Figure 6:
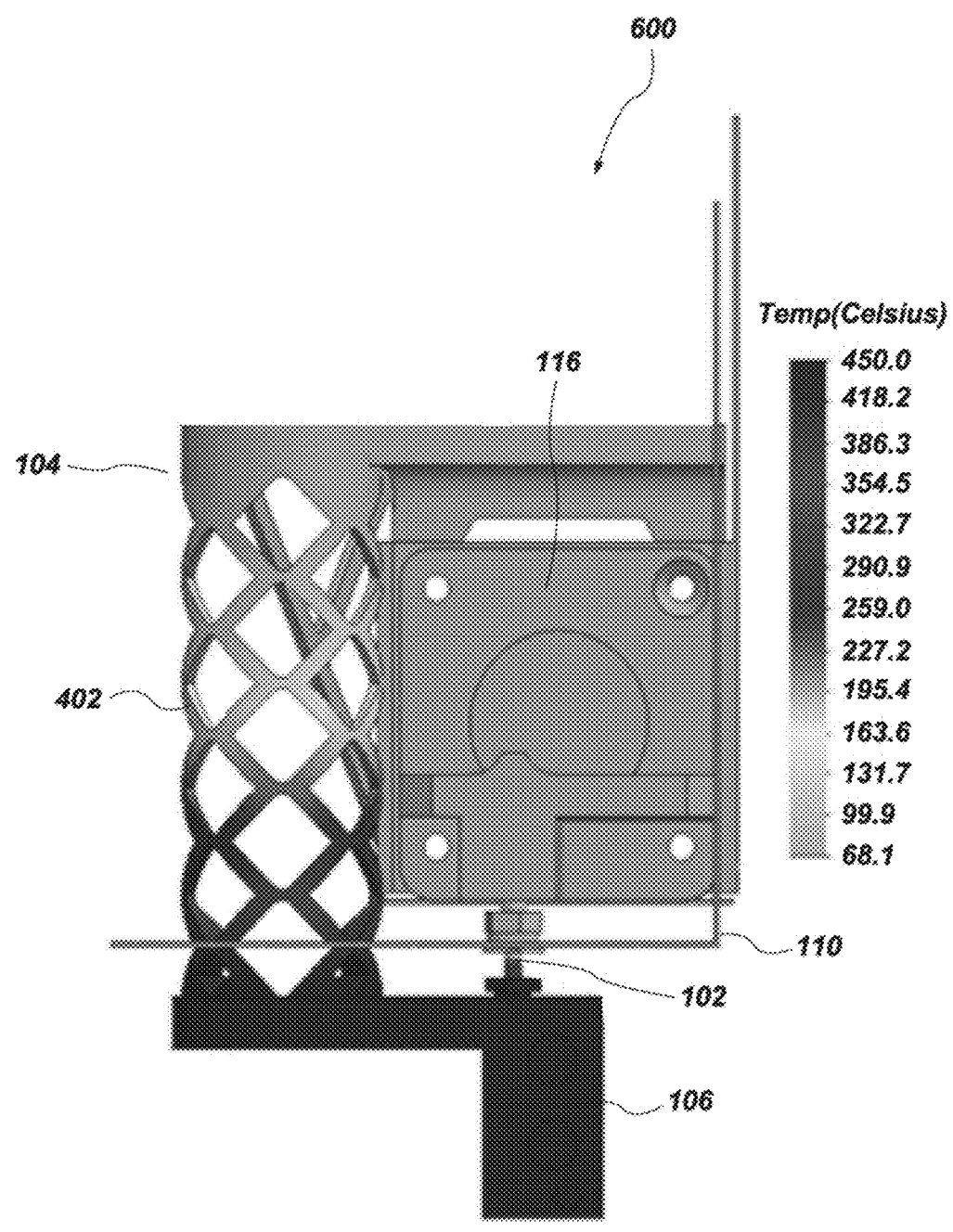
FIG. 6 is a schematic gray-scale view of a temperature profile of the tool of FIGS. 1A-2 during operation, according to one or more embodiments of the present disclosure.

FIG. 6 is a schematic gray-scale view of a temperature profile 600 of the tool 100 during operation, according to one or more embodiments of the disclosure. As shown in FIG. 6, heat at or around 450° C. produced by the heat block 106 may be conducted into the lattice structure 402 of the support structure 104 and the heat break 102 and heat break radiator 110 while the extruder assembly 116 remains at a lower temperature (e.g., about 68° C.). The lower temperature of the extruder assembly 116 substantially reduces a likelihood that feed materials extruded by the extruder assembly 116 will melt and buckle before being extruded through the heat break 102 into the heat block 106.

Figure 7:
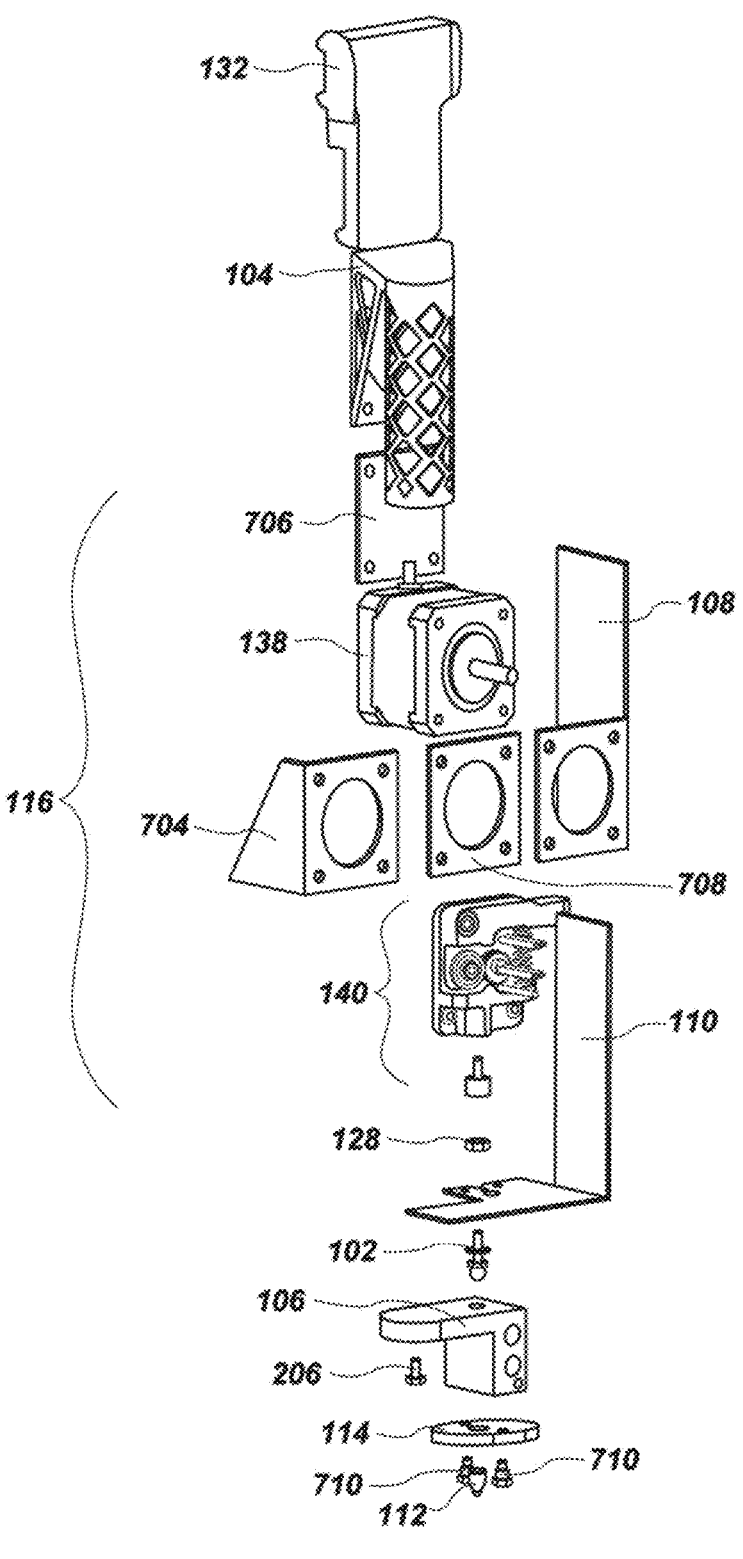
FIG. 7 is an exploded view of the tool of FIGS. 1A-2, according to one or more embodiments of the present disclosure.

FIG. 7 is an exploded view of the tool 100, according to one or more embodiments of the present disclosure. As previously described, the tool 100 includes the nozzle 112 coupled to the heat block 106 and may include the optional heat shield 114. The heat shield 114 may be coupled to the heat block 106 via heat shield bolts 710. The heat break 102 may be located adjacent to the heat block 106 and the heat break radiator 110 may be coupled to a surface of the heat break 102 via the heat break nut 128. The heat break 102 may also be located adjacent to the extruder assembly 116. The extruder assembly 116 may include extruder 140, radiator 704, spacers 706 and 708, extruder radiator 108, and motor 138. The extruder 140 may interface with the extruder radiator 108, which may interface with the spacer 708 between the extruder radiator 108 and the radiator 704. The radiator 704 may interface with the motor 138 where a portion of the motor 138 may extend through an opening of the radiator 704. A spacer 706 may interface with the motor 138 on a side of the motor 138 opposite the radiator 704. The support structure 104 may be coupled to the extruder assembly 116 as well as the heat block 106, the support structure 104 may interface with interface bracket 132, which may be used to removably affix the tool 100 to an additive manufacturing movement device.

Figure 8:
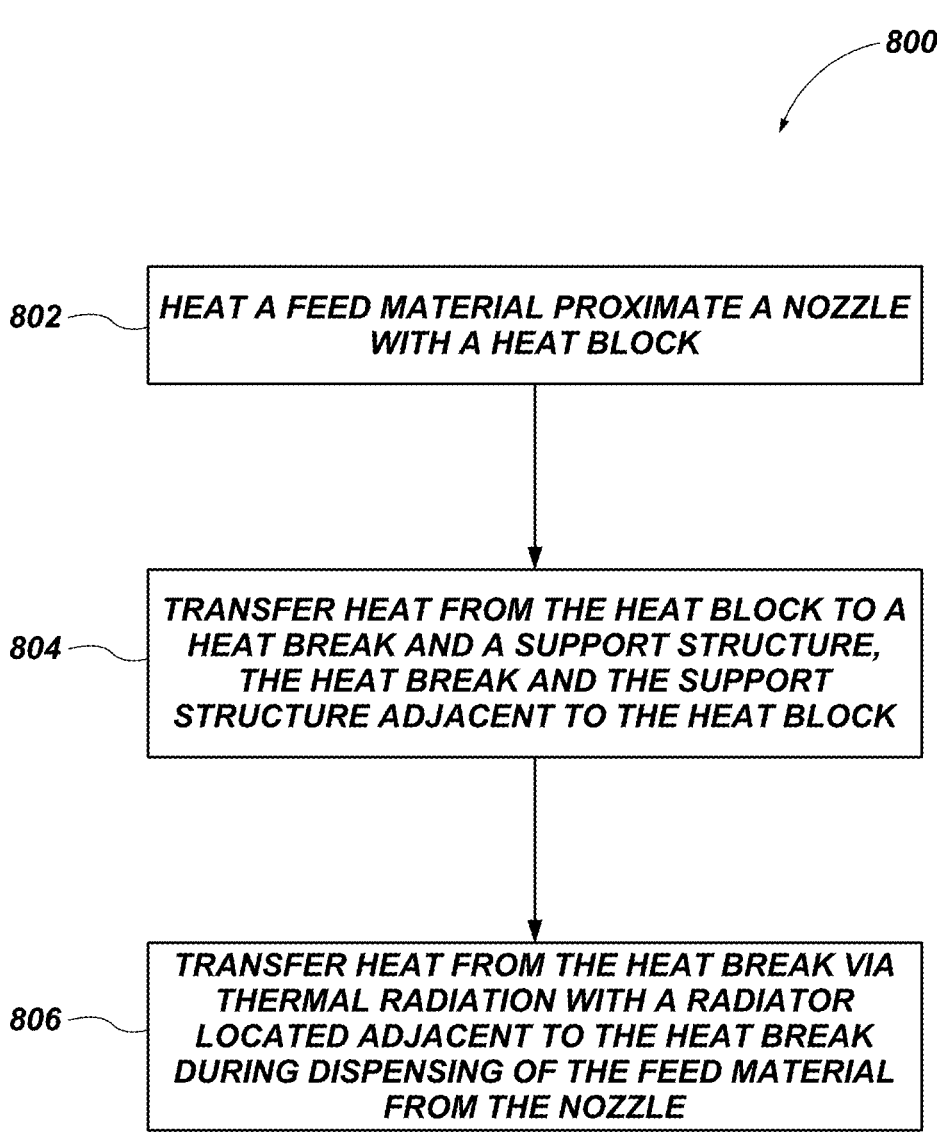
FIG. 8 depicts a schematic flowchart of a method for additively manufacturing in a vacuum, according to one or more embodiments of the present disclosure.

FIG. 8 depicts a schematic flowchart of a method 800 for additively manufacturing an article in a vacuum, according to one or more embodiments of the present disclosure. The method 800 may include heating a feed material proximate a nozzle (e.g., nozzle 112) in at least one of a microgravity or low-pressure environment with a heat block (e.g., heat block 106), as shown in act 802 of FIG. 8. The method 800 may further include transferring heat in at least one of a microgravity or low-pressure environment from the heat block to a heat break (e.g., heat break 102) and a support structure (e.g., support structure 104), the heat break and the support structure adjacent to the heat block, as shown in act 804. As discussed above with reference to FIGS. 1A through 2, the heat break may be located between the heat block and a feed material extruder (e.g., extruder 140) configured to extrude the feed material. The feed material may pass through the heat break and heat block and out of the nozzle to be deposited on a surface. As the feed material passes through the heat block, the heat block may generate heat sufficient to melt the feed material as the feed material passes through the heat block. The heat generated from the heat block may be conducted into surrounding structures such as the heat break and the support structure.

With continued reference to FIG. 8, the method 800 may further include transferring heat in at least one of a microgravity or low-pressure environment from the heat break via thermal radiation with a radiator (e.g., the heat break radiator 110) located adjacent to the heat break while dispensing of the feed material from the nozzle, as indicated at act 806. For example, the radiator may be configured to interface with the heat break in the manner described above in FIG. 7. The method 800 may further include repeatedly depositing the feed material on a substrate to form an article. The resulting articles formed by the method 800 may have complex shapes and exhibit good adhesion between layers of the feed material. Features of the articles may exhibit a desired resolution.

The tool 100 (FIG. 1) may be configured to form one or more articles in low pressure environments (e.g., in a vacuum), such as in outer space. In some embodiments, the tool 100 may be configured to form articles in zero gravity, microgravity environments, or other environments. However, the disclosure is not so limited, and the tool 100 may be configured to form articles in other environments, such as under atmospheric conditions or under high pressure conditions. Articles that may be formed with the tool 100 may include, for example, components for satellite structures (e.g., satellite frame structures, a truss structure, etc.), components for aerospace structures (e.g., space shuttles, rockets, satellites, missiles, etc.), components for aircraft structures (e.g., airplanes, helicopters, etc.), components for military vehicle structures, or for other structures. In some embodiments, the tool 100 may be used to repair or fabricate replacement parts for one or more existing structures located in a zero or microgravity and/or low-pressure environment (such as outer space). In some embodiments, the tool 100 may be incorporated onto a robot arm of an additive manufacturing tool. Such an additive manufacturing tool may include a plurality of robot arms.

Accordingly, an additive manufacturing tool may be configured to additively manufacture one or more articles using high-grade plastics with a high melting point (e.g., about 450° C.) without a conduction heat transfer mechanism such as a water cooler or a convective heat transfer mechanism requiring moving parts, such as a fan. The additive manufacturing tool may be configured to additively manufacture the one or more articles in space, for example. Large articles may be additively manufactured in space or other low pressure, low gravity environments. By additively manufacturing the articles in space, fewer raw materials and resources are launched into orbit. A radiator may be operably coupled to a heat break of the additive manufacturing tool. The radiator may be configured to transfer heat from the heat break via conductive thermal transfer and may be further configured to conduct heat from the radiator to an external environment by radiative thermal transfer. The radiator may remove heat from the tool without forced air cooling and without liquid cooling, which often require significant amounts of power and are prone to failure. By way of comparison, the radiator removes heat passively by thermal radiation and does not require external power or moving parts.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. An apparatus for additively manufacturing an article, the apparatus comprising:
   a heat block;
   a feed material extruder;
   a nozzle in operable communication with the heat block and configured to receive a feed material;
   a heat break positioned between the heat block and the feed material extruder, the heat break coupled to the heat block, at least a portion of the heat break extending into the heat block;

a heat break radiator secured to at least one surface of the heat break; and
   an extruder radiator secured to at least one surface of the feed material extruder.

2. The apparatus of claim 1, wherein at least one of the heat break radiator and the extruder radiator comprises copper.

3. The apparatus of claim 1, further comprising a heat shield surrounding at least a portion of the nozzle.

4. The apparatus of claim 1, further comprising a lattice support structure coupled to the heat block, a longitudinal axis of the lattice support structure offset from a longitudinal axis of the nozzle.

5. The apparatus of claim 1, wherein the heat break comprises titanium.

6. The apparatus of claim 1, wherein the heat break radiator is secured to the at least one surface of the heat break by a titanium washer and a titanium nut.

7. The apparatus of claim 1, wherein the feed material extruder is coupled to the heat break and in operable communication with the heat block.

8. The apparatus of claim 7, further comprising a motor operably coupled to the feed material extruder.

9. The apparatus of claim 1, wherein the heat break radiator surrounds at least a portion of the heat break.

10. The apparatus of claim 1, further comprising an insulated blanket surrounding at least a portion of the heat block.

11. The apparatus of claim 1, wherein the heat break comprises an at least substantially cylindrical neck portion comprising an outer wall having a thickness less than a thickness of the heat break radiator.

12. The apparatus of claim 1, wherein the heat break extends through an aperture defined by the heat break radiator.

13. The apparatus of claim 1, wherein surfaces of the heat break radiator are spaced from surfaces of the heat block by a gap.

14. The apparatus of claim 1, wherein the heat break radiator and the extruder radiator have a greater thermal conductivity than the feed material extruder, the heat break, the heat block, and the nozzle.

15. The apparatus of claim 1, wherein outer surfaces of the heat break radiator and the extruder radiator are coated with one or more of black paint, white paint, an optical solar reflector, or silvered polytetrafluoroethylene.

16. A tool for additively manufacturing an article in a vacuum, the tool comprising:
   a nozzle configured to receive a feed material;
   a heat block coupled to the nozzle; and
   a lattice support structure coupled to the heat block, a center longitudinal axis of the lattice support structure offset from a center longitudinal axis of the nozzle.

17. The tool of claim 16, further comprising a heat break coupled to the heat block, at least a portion of the heat break extending into the heat block.

18. The tool of claim 16, wherein the lattice support structure comprises titanium.

19. The tool of claim 17, wherein the heat break thermally isolates, from the heat block, an extruder assembly through which the feed material extends.

* * * * *